United States Patent
Wu et al.

(10) Patent No.: US 7,405,788 B2
(45) Date of Patent: Jul. 29, 2008

(54) METHOD FOR ALIGNMENT OF LIQUID CRYSTAL MOLECULES BY USING HYDROGEN ION BEAM IN AN AMOUNT GREATER THAN ONE HUNDRED TIMES THAT OF NON-HYDROGEN IONS

(75) Inventors: Bang-Hao Wu, Kao Hsiung (TW);
Ching-Wen Hsiao, Pan Chiao (TW);
Yu-Ming Chen, Hsin Chu (TW);
Hsin-Chun Chiang, Hsin Chu (TW);
Chung-Wen Wu, Hsin Chu Hsien (TW)

(73) Assignees: Taiwan TFT LCD Association, Hsinchu (TW); Chunghwa Picture Tubes, Ltd., Taoyuan (TW); Au Optronics Corp., Hsinchu (TW); Quanta Display Inc., Tao Yuan Shien (TW); Hannstar Display Corp., Tainan County (TW); Chi Mei Optoelectronics Corp., Tainan County (TW); Industrial Technology Research Institute, Hsinchu (TW); Toppoly Optoelectronics Corp., Miao-Li County (TW)

( * ) Notice: Subject to any disclaimer, the term of this patent is extended or adjusted under 35 U.S.C. 154(b) by 374 days.

(21) Appl. No.: 11/242,919

(22) Filed: Oct. 5, 2005

(65) Prior Publication Data
US 2007/0002270 A1    Jan. 4, 2007

(30) Foreign Application Priority Data
Jul. 1, 2005    (TW)    .............................. 94122466 A

(51) Int. Cl.
*G02F 1/1337*    (2006.01)

(52) U.S. Cl. ...................................... 349/124; 349/191
(58) Field of Classification Search ................. 349/124, 349/132, 191
See application file for complete search history.

(56) References Cited

U.S. PATENT DOCUMENTS

| 4,153,529 | A | 5/1979 | Little et al. |
|---|---|---|---|
| 5,030,322 | A | 7/1991 | Shimada et al. |
| 5,770,826 | A | 6/1998 | Chaudhari et al. |
| 6,020,946 | A | 2/2000 | Callegari et al. |
| 6,061,114 | A | 5/2000 | Callegari et al. |
| 6,485,614 | B2 | 11/2002 | Katoh et al. |
| 6,665,033 | B2 | 12/2003 | Callegari et al. |
| 2003/0210371 | A1 * | 11/2003 | Chaudhari et al. ........... 349/124 |
| 2004/0086662 | A1 | 5/2004 | Callegari et al. |

FOREIGN PATENT DOCUMENTS

| TW | 591274 | 6/2004 |
|---|---|---|
| TW | 1249062 | 2/2006 |

* cited by examiner

*Primary Examiner*—David C. Nelms
*Assistant Examiner*—John Heyman
(74) *Attorney, Agent, or Firm*—Rabin & Berdo, P.C.

(57) ABSTRACT

A method that uses at least one hydrogen ion beam for alignment of liquid crystal molecules is proposed in the present invention. The method of the present invention is proposed to resolve the problems of physical destruction and surface deterioration of the alignment films caused by the conventional method using argon ions beams. The method of the present invention directly uses at least one hydrogen ion beam to impact the alignment film. Hence, the physical destruction of the alignment film is reduced. In addition, via the reaction between hydrogen ions and the alignment films, the quality of the alignment film is improved.

9 Claims, 4 Drawing Sheets

METHOD FOR ALIGNMENT OF LIQUID CRYSTAL MOLECULES BY USING HYDROGEN ION BEAM IN AN AMOUNT GREATER THAN ONE HUNDRED TIMES THAT OF NON-HYDROGEN IONS

BACKGROUND OF THE INVENTION

1. Field of the Invention

The present invention is related to a method for alignment of liquid crystal molecules, and more particularly, to a method that uses a hydrogen ion beam for alignment of liquid crystal molecules.

2. Description of Related Art

In convention, ion beam bombardment for alignment of liquid crystal molecules is achieved by using an argon ion beam. The related technologies are already disclosed in many issued patents. For example, U.S. Pat. No. 4,153,529, "Means and method for inducing uniform parallel alignment of liquid crystal material in a liquid crystal cell," is the first patent about using ion beams for alignment of liquid crystal. This technique is applied mainly for inorganic alignment films, including carbon alignment films. The thickness of the alignment films is about 100-5000 A and the energy of the ion beam is about 1-3 keV.

U.S. Pat. No. 6,020,946, "Dry processing for liquid-crystal displays using low energy ion bombardment," which belongs to IBM Corporation, also discloses the technique about using ion beams for alignment of liquid crystal. The main difference between this patent and the previous patent, i.e. U.S. Pat. No. 4,153,529, is that the thickness of the alignment films and the energy of the used ion beam are different. The thickness of the alignment films disclosed in this patent is about 10-100 A and the energy of the used ion beam is about 75-200 eV.

U.S. Pat. No. 5,030,322, "Method of forming orientation film of liquid-crystal display device," issued in 1991 and owned by Sharp Corporation discloses the technique about using ion beams for alignment of liquid crystal. This technique is applied mainly for organic alignment films that are made of polyimide (PI), polyurethane (PU), or polyamide (PA).

U.S. Pat. No. 5,770,826, "Atomic beam alignment of liquid-crystals," owned by IBM Corporation discloses the application of ion beams on organic alignment films that are substantially made of PI. The energy is limited to a level below 200 eV to mitigate the surface deterioration of the organic alignment films caused by high-energy ion beams.

In U.S. Pat. No. 6,485,614, "Method to stabilize a carbon alignment layer for liquid crystal displays," IBM Corporation proposed a technique of performing a hydrogen process on the alignment films after the alignment process is performed by using ion beams. This technique is used mainly to passivate dangling bonds.

U.S. Pat. No. 6,665,033, "Method for forming alignment layer by ion beam surface modification," owned by IBM Corporation also discloses a technique about passivation of dangling bonds. The difference between this patent and U.S. Pat. No. 6,485,614 is that the ion beams can be combined with reactive gases, such as silane, tetrafluoromethane (CF4), nitrogen, oxygen, hydrogen, and fluorine, for in-situ passivation of dangling bonds.

Reference is made to FIG. 1, which is a schematic diagram showing an argon ion beam impacting an alignment layer in accordance with the prior art. It shows a device having a glass substrate 10, a conductive layer 12 formed on the glass substrate 10, and an alignment layer 14 formed on the conductive layer 12. An argon ion beam 16 is used to impact the alignment layer 14 and thus causes chemical and physical destruction 18 on the surface of the alignment layer 14.

In the above-mentioned literatures, argon ion beams are used for alignment process. However, since the argon ion beams have low chemical activity and large particles, serious physical destruction is easy to occur on the surface of the alignment films and deteriorates them. The physical and chemical destruction may act as the active sites for ions trapping and problems of image flicker and image sticking thus happen. In U.S. Pat. No. 6,485,614 proposed by IBM Corporation, an argon ion beam is used to impact an alignment film and then hydrogen atoms are used to passivate dangling bonds. In another patent proposed by IBM Corporation, i.e. U.S. Pat. No. 6,665,033, reactive ions are applied on dangling bonds to form a passivation layer.

Accordingly, as discussed above, the prior art still has some drawbacks that could be improved upon. The present invention aims to resolve the drawbacks of the prior art.

SUMMARY OF THE INVENTION

An objective of the present invention is to provide a method that uses a hydrogen ion beam for alignment of liquid crystal molecules. Since the hydrogen ion beam has small particles and high chemical activity, the physical destruction on surfaces of alignment films is reduced and the deterioration of the alignment films caused by the conventional method using argon ions beams is mitigated via the reaction between hydrogen ions and the alignment films.

For achieving the objective above, the present invention provides a method for alignment of liquid crystal molecules, including providing an alignment film, producing a hydrogen ion beam, setting an incident angle, energy, and dosage of the hydrogen ion beam, and emitting the hydrogen ion beam to impact the alignment film.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

In the present invention, hydrogen ion beams, which have small particles and high chemical activity, are used for the alignment process. Hence, the physical destruction of the alignment films is reduced. Besides, the hydrogen ion beams are capable of chemically reacting with the alignment films and improve upon alignment properties thereby.

Figure 1:
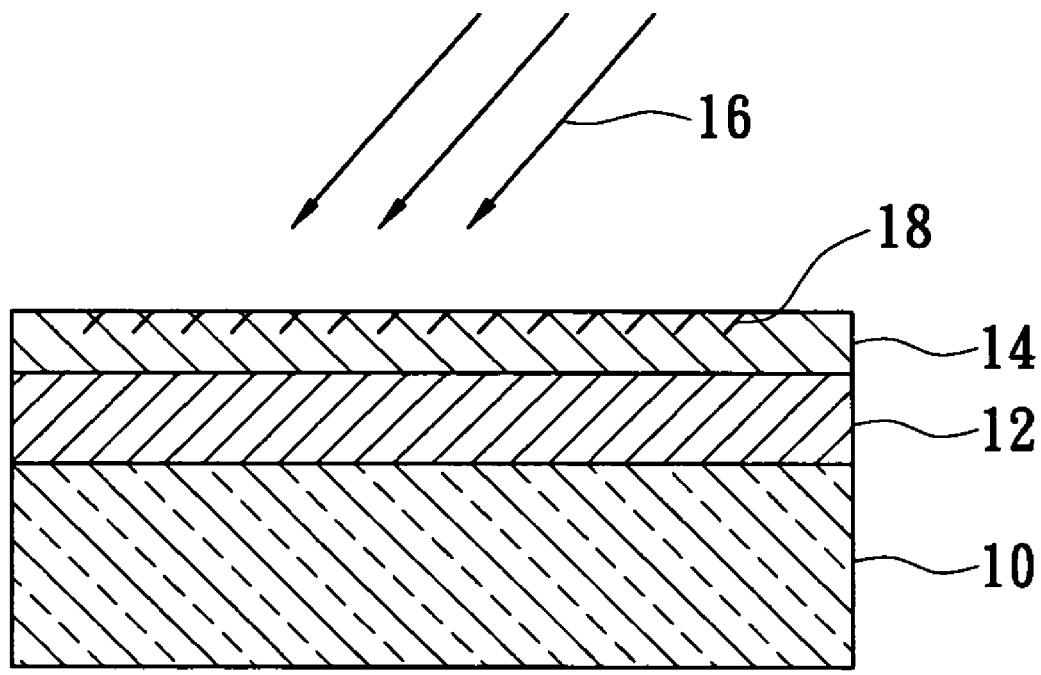
FIG. 1 is a schematic diagram showing an argon ion beam impacting an alignment layer in accordance with the prior art.
Figure 2:
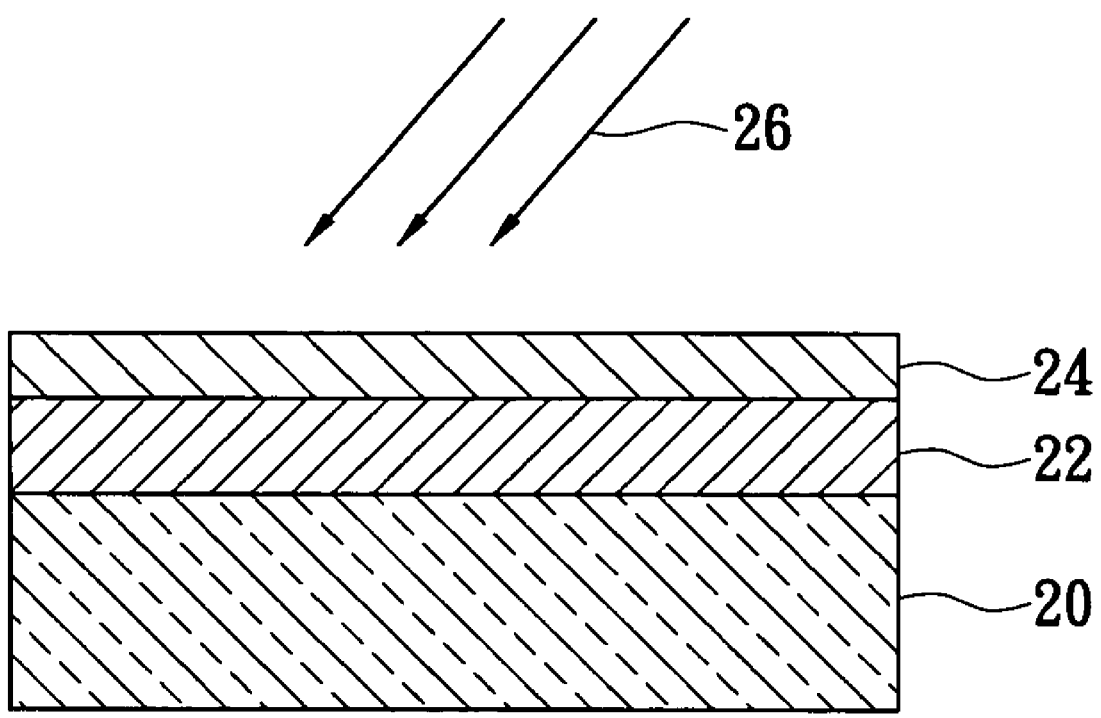
FIG. 2 is a schematic diagram showing a hydrogen ion beam impacting an alignment layer in accordance with the present invention.

Reference is made to FIG. 2, which is a schematic diagram showing a hydrogen ion beam impacting an alignment layer in accordance with the present invention. It shows a device having a glass substrate 20, a conductive layer 22 formed on the glass substrate 20, and at least one alignment layer 24 formed on the conductive layer 22. At least one hydrogen ion beam 26 is used to impact the alignment layer 24. Compared with the prior art, since the hydrogen ion beam 26 has small particles and high chemical activity, dangling bonds and physical and chemical destruction are not caused after impact of the hydrogen ion beam 26.

Figure 3:
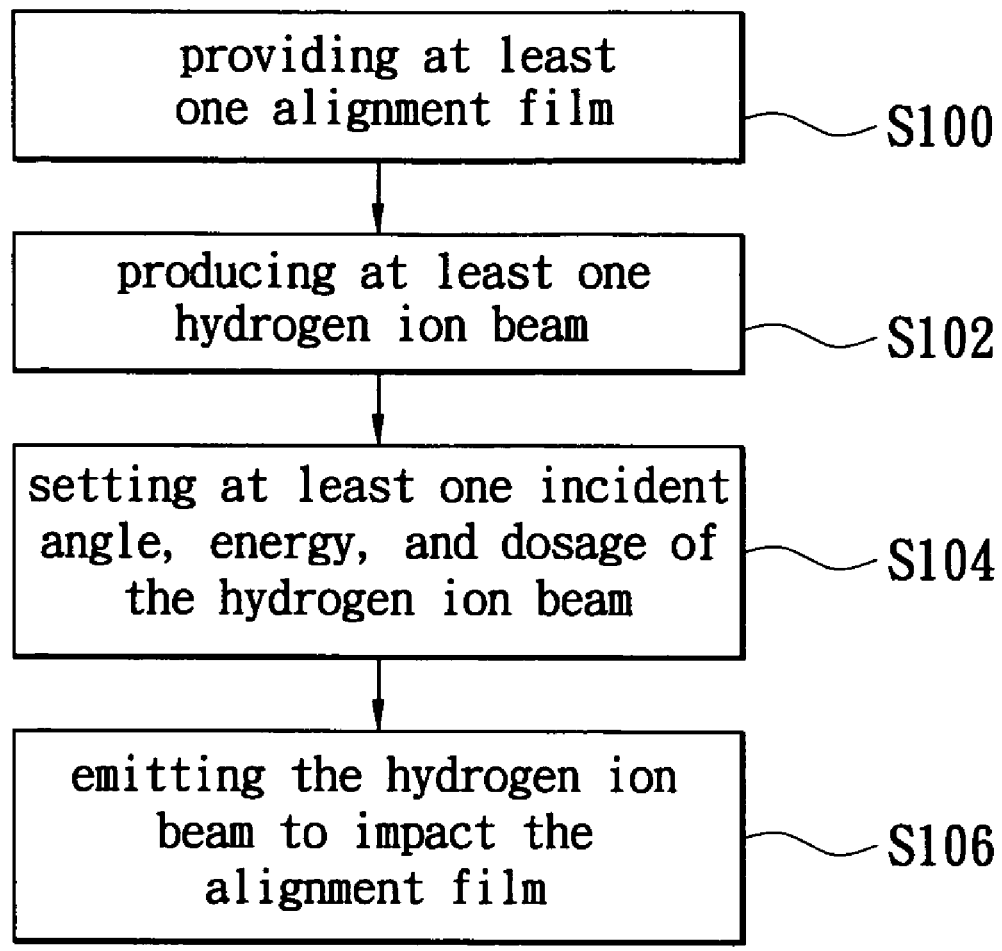
FIG. 3 is a flowchart of a method for alignment of liquid crystal molecules using a hydrogen ion beam in accordance with a preferred embodiment of the present invention.

Reference is made to FIG. 3, which is a flowchart of a method for alignment of liquid crystal molecules using a hydrogen ion beam in accordance with a preferred embodiment of the present invention. The method includes steps as follows. At least one alignment film is first provided (step S100). Therein, the alignment film is made of an organic material or an inorganic material. The organic material can be polyimide while the inorganic material can contain carbon.

After step S100 is performed, at least one hydrogen ion beam is produced (step S102). Therein, the hydrogen ions contained in the hydrogen ion beam is above one hundred times the number of other ions, i.e. non-hydrogen ions. After the hydrogen ion beam is produced, at least one incident angle, energy, and dosage of the hydrogen ion beam are set (step S104). Then, the hydrogen ion beam is emitted to impact the alignment film (step S106).

Figure 4:
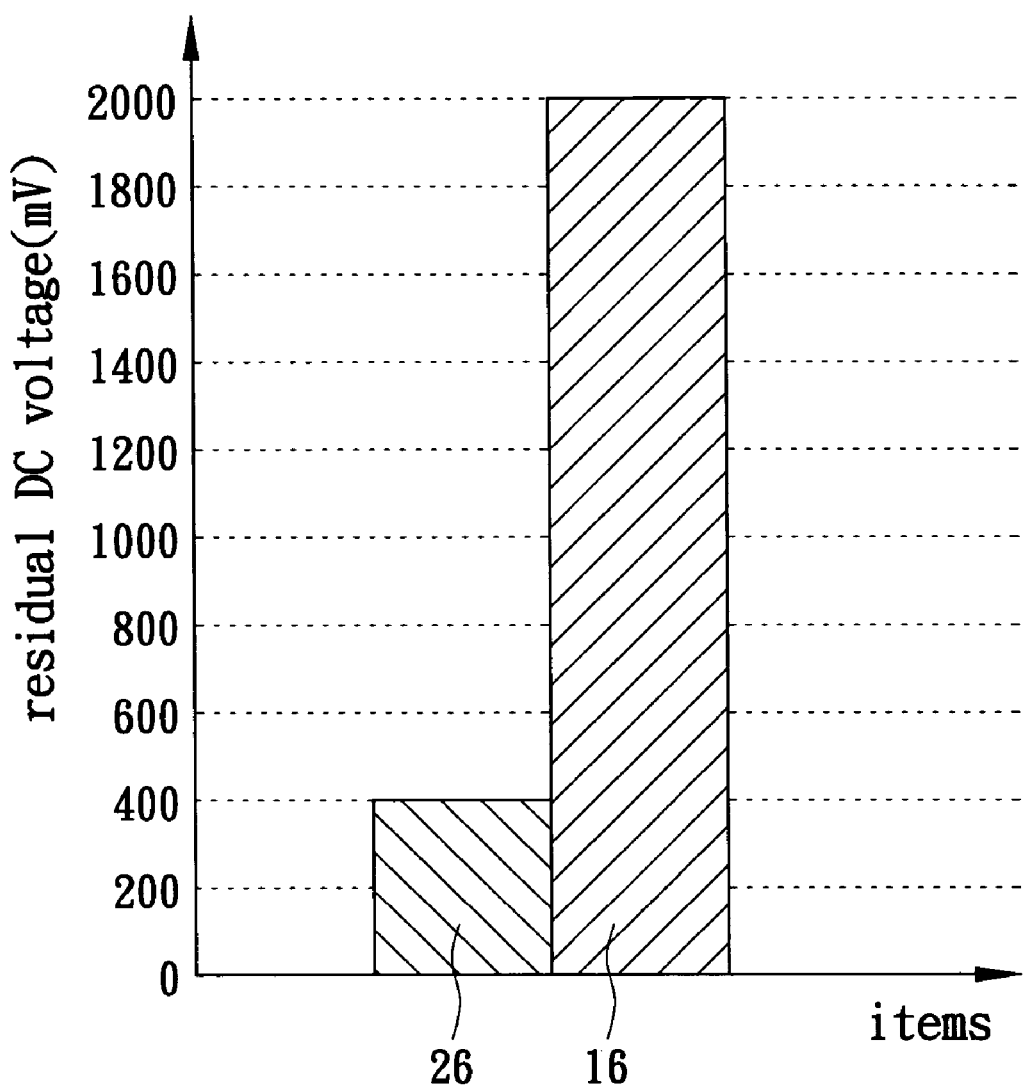
FIG. 4 shows the residual DC voltages of the LC cells made of argon and hydrogen ion beams.

Reference is made to FIG. 4, which shows the residual direct current (DC) voltages of the LC cells made of argon and hydrogen ion beams. The problems of image flicker and image sticking occur easily when the residual DC voltage is large. In the present invention, since the hydrogen ion beam has small particles, the physical destruction caused by impact of ion beams is reduced. Hence, the alignment layer has fewer defects to absorb charged ions and the residual DC voltage is thus lowered. In addition, since the hydrogen ion beam has high chemical activity, most of the bonds on the surface of the alignment layer become non-polar covalent bonds after impact of the hydrogen ion beam. It is also helpful for reduction of the residual DC voltage.

In the present invention, a hydrogen ion beam is used for alignment of liquid crystal alignment films, including organic or inorganic alignment films. Since the particles of the hydrogen ion beam are small, the physical destruction on the surface of the alignment film is reduced and the electric property of the alignment film surface is improved thereby. In addition, since the hydrogen ion beam has high chemical activity, it can react with the surface of the alignment film to stabilize the alignment film. Moreover, in the design of ion beam producing machines, since the physical destruction caused by the hydrogen ion beam is very small, the energy level of the ion beams is not necessary to be lower than 200 eV as IBM's patent has mentioned. Thus, the uneven beam current that easily occurs in the development of low-energy ion beams is mitigated.

In addition, since the hydrogen ion beam rarely induces physical destruction and has high chemical activity, it causes a series of reactions, such as hydrogenation, dehydrogenation, erosion, and bond forming. It is helpful for producing anisotropic bonds on the surface of the alignment film and thus making the alignment process be performed.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are embraced within the scope of the invention as defined in the appended claims.

What is claimed is:

1. A method for alignment of liquid crystal molecules, comprising:
   providing at least one alignment film;
   producing at least one hydrogen ion beam containing hydrogen ions in an amount which is greater than one hundred times that of non-hydrogen ions; and
   emitting the hydrogen ion beam to impact the alignment film.

2. The method as claimed in claim 1, wherein the alignment film is made of an organic material or an inorganic material.

3. The method as claimed in claim 2, wherein the organic material is polyimide (PI).

4. The method as claimed in claim 2, wherein the inorganic material contains carbon.

5. The method as claimed in claim 1, wherein the step of producing the at least one hydrogen ion beam further comprises:
   setting at least one incident angle, energy, and dosage of the at least one hydrogen ion beam.

6. A method for alignment of liquid crystal molecules, comprising:
   providing at least one alignment film;
   producing at least one hydrogen ion beam containing hydrogen ions in an amount which is greater than one hundred times that of non-hydrogen ions;
   setting at least one incident angle, energy, and dosage of the at least one hydrogen ion beam; and
   emitting the hydrogen ion beam to impact the alignment film.

7. The method as claimed in claim 6, wherein the alignment film is made of an organic material or an inorganic material.

8. The method as claimed in claim 7, wherein the organic material is PI.

9. The method as claimed in claim 7, wherein the inorganic material contains carbon.

* * * * *

UNITED STATES PATENT AND TRADEMARK OFFICE
CERTIFICATE OF CORRECTION

| | |
|---|---|
| PATENT NO. | : 7,405,788 B2 |
| APPLICATION NO. | : 11/242919 |
| DATED | : July 29, 2008 |
| INVENTOR(S) | : Bang-Hao Wu et al. |

Page 1 of 1

It is certified that error appears in the above-identified patent and that said Letters Patent is hereby corrected as shown below:

Title page, item (73), the address of Assignee Hannstar Display Corp. should be Taipei (TW).

Signed and Sealed this

Seventh Day of October, 2008

JON W. DUDAS
*Director of the United States Patent and Trademark Office*